US010250955B2

(12) United States Patent
Schwartz et al.

(10) Patent No.: US 10,250,955 B2
(45) Date of Patent: Apr. 2, 2019

(54) WIRELESS BUILDING SENSOR SYSTEM

(71) Applicant: Palo Alto Research Center Incorporated, Palo Alto, CA (US)

(72) Inventors: David Eric Schwartz, San Carlos, CA (US); George Daniel, Los Altos, CA (US); Clinton Smith, San Francisco, CA (US); Scott A. Elrod, Palo Alto, CA (US); Daniel H. Greene, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/352,095

(22) Filed: Nov. 15, 2016

(65) Prior Publication Data

US 2018/0139517 A1    May 17, 2018

(51) Int. Cl.

| | |
|---|---|
| *G08C 19/22* | (2006.01) |
| *H04Q 9/00* | (2006.01) |
| *H02J 50/20* | (2016.01) |
| *H02J 50/40* | (2016.01) |
| *F24F 11/56* | (2018.01) |
| *F24F 110/10* | (2018.01) |
| *F24F 110/20* | (2018.01) |

(Continued)

(52) U.S. Cl.
CPC ............ *H04Q 9/00* (2013.01); *F24F 11/56* (2018.01); *H02J 50/20* (2016.02); *H02J 50/40* (2016.02); *F24F 2110/10* (2018.01); *F24F 2110/20* (2018.01); *F24F 2110/30* (2018.01); *F24F 2110/50* (2018.01); *H04Q 2209/40* (2013.01); *H04Q 2209/88* (2013.01)

(58) Field of Classification Search
None
See application file for complete search history.

(56) References Cited

U.S. PATENT DOCUMENTS

| | | |
|---|---|---|
| 5,229,919 A | 6/1993 | Phillips |
| 5,991,032 A | 11/1999 | Atkinson |
| 6,622,925 B2 | 9/2003 | Carner et al. |

(Continued)

OTHER PUBLICATIONS

U.S. Appl. No. 15/150,939, filed May 10, 2016, Inventor: David E. Schwartz, "Printed Level Sensor".

(Continued)

*Primary Examiner* — Adolf Dsouza
(74) *Attorney, Agent, or Firm* — Fay Sharpe LLP

(57) ABSTRACT

A system of sensor nodes is combined with an RF hub that transmits RF power to the sensors and receives data therefrom. The sensor nodes contain: one or more sensors for measuring indoor conditions, an antenna, an energy storage element, and electronics for powering the system via harvesting RF energy, reading sensor data, and communicating sensor data. The sensors, antenna, and other components on the nodes can be fabricated conventionally, or via printing. They may be fabricated as "flexible hybrid electronics", in which conventional components are bonded onto flexible substrates. The RF hub consists of one or more antennas capable of transmitting RF power electronics for steering the center of radiation of the RF power in at least one direction or in more than one direction electronics for receiving a demodulating RF data signal. The RF hub may be powered directly from the building.

21 Claims, 9 Drawing Sheets

(51) Int. Cl.
*F24F 110/50* (2018.01)
*F24F 110/30* (2018.01)

(56) References Cited

U.S. PATENT DOCUMENTS

| | | | |
|---|---|---|---|
| 7,057,330 B2 | 6/2006 | Buhler et al. | |
| 7,318,908 B1 | 1/2008 | Dai | |
| 8,256,286 B2 | 9/2012 | Carroll et al. | |
| 8,414,831 B2 | 4/2013 | Jayatissa | |
| 8,479,807 B2 | 7/2013 | Short | |
| 8,682,600 B2 | 3/2014 | Genta | |
| 8,720,551 B2 | 5/2014 | Short | |
| 8,903,558 B2 | 12/2014 | Jarrell et al. | |
| 9,952,082 B2 | 4/2018 | Schwartz | |
| 2002/0005580 A1 | 1/2002 | Goodman | |
| 2003/0033032 A1 | 2/2003 | Lind | |
| 2004/0030667 A1 | 2/2004 | Xu | |
| 2004/0060346 A1 | 4/2004 | Bonne et al. | |
| 2004/0075566 A1 | 4/2004 | Stepanik | |
| 2004/0136866 A1 | 7/2004 | Pontis | |
| 2005/0145018 A1 | 7/2005 | Sabata et al. | |
| 2007/0179730 A1 | 8/2007 | Bornhoevd | |
| 2008/0183389 A1* | 7/2008 | Chainer | G01W 1/00 702/2 |
| 2008/0286807 A1 | 11/2008 | Bakke | |
| 2009/0058663 A1 | 3/2009 | Joshi | |
| 2009/0093065 A1 | 4/2009 | Ding | |
| 2009/0112115 A1 | 4/2009 | Huang | |
| 2010/0090845 A1 | 4/2010 | Polak | |
| 2011/0222438 A1 | 9/2011 | Wang | |
| 2012/0248092 A1 | 10/2012 | Uhland et al. | |
| 2013/0024134 A1 | 1/2013 | Lukasik | |
| 2013/0031278 A1 | 1/2013 | Lin | |
| 2013/0053988 A1* | 2/2013 | Lin | G05B 15/02 700/83 |
| 2013/0197384 A1 | 8/2013 | Tang | |
| 2013/0300574 A1 | 11/2013 | Gillette, II | |
| 2013/0301674 A1 | 11/2013 | Gillette, II | |
| 2014/0138259 A1 | 5/2014 | Mickelson | |
| 2014/0251021 A1 | 9/2014 | Keeter | |
| 2015/0330657 A1 | 11/2015 | Kates | |
| 2016/0018799 A1 | 1/2016 | Gettings et al. | |
| 2016/0029966 A1 | 2/2016 | Salas-Boni | |
| 2016/0086087 A1 | 3/2016 | Ghouti | |
| 2016/0127172 A1 | 5/2016 | Shaw | |
| 2016/0254844 A1* | 9/2016 | Hull | H04B 5/0062 340/6.1 |
| 2017/0026722 A1* | 1/2017 | Schwartz | H04Q 9/00 |
| 2017/0062309 A1* | 3/2017 | Ogras | H01L 23/4985 |
| 2017/0223749 A1* | 8/2017 | Sheldon | H04B 7/0617 |

OTHER PUBLICATIONS

Li, et al. "Inkjet Printed Chemical Sensor Array Based on Polythiophene Conductive Polymers", Sensors and Actuators B 123, 2007 pp. 651-660.
Oleum Tech Corporation, "Industrial Wireless Automation", 2 pages, 2015.
Ames Technology Capabilities and Facilities, "Carbon Nanotube Sensors for Gas Detection", Mar. 29, 2008, 2 pages.
Search Report in EP 17201204.9-1008 dated May 3, 2018 (9pgs).

* cited by examiner

WIRELESS BUILDING SENSOR SYSTEM

TECHNICAL FIELD

The present application is related to the field of building sensors and more particularly to devices and systems for transmitting power to a sensor and receiving data from the sensor to an RF hub.

BACKGROUND

The widespread deployment of advanced sensors in the buildings sector has the potential to unleash significant energy savings, yet this is currently limited by the high cost of hardware and installation. Wireless communication can greatly reduce installation cost. However, wireless sensors currently rely on batteries with limited lifetime, or indoor-light harvesting, with high device cost and reduced power availability. Directed RF energy harvesting can provide robust power using simple, inexpensive components. Plug-and-play sensors that self-locate can reduce installation and commissioning labor costs while providing dense environmental and room configuration information.

BRIEF DESCRIPTION

In one embodiment of this disclosure, a wireless system for measuring indoor building conditions is described. The wireless system comprises one or more sensor nodes powered by centralized RF power configured to send and receive building data and an RF hub configured to automatically locate each sensor node remotely using beam steering, transmit RF power to the sensors and to receive data from the one or more sensors.

In another embodiment of this disclosure, described is a wireless sensor node. The wireless sensor node is powered by centralized RF power and is used for measuring indoor building conditions. The sensor node includes at least one antenna, one or more sensors, and logic circuitry, where the logic circuitry can be a processor. The logic circuitry is configured to control power provided to the sensor node via harvested RF energy, read sensor data, and communicate sensor data.

In another embodiment of the disclosure, described is a method for measuring indoor building conditions. The method includes one or more sensor nodes and an RF hub. The one or more sensor nodes includes one or more sensors and one or more antennas, with the one or more sensors configured to receive power and deliver building condition information to the one or more sensor nodes. The RF hub includes one or more antennas configured to direct power to the one or more sensor nodes and to receive building condition information from the one or more sensors on the one or more sensor nodes.

DETAILED DESCRIPTION

Figure 1:
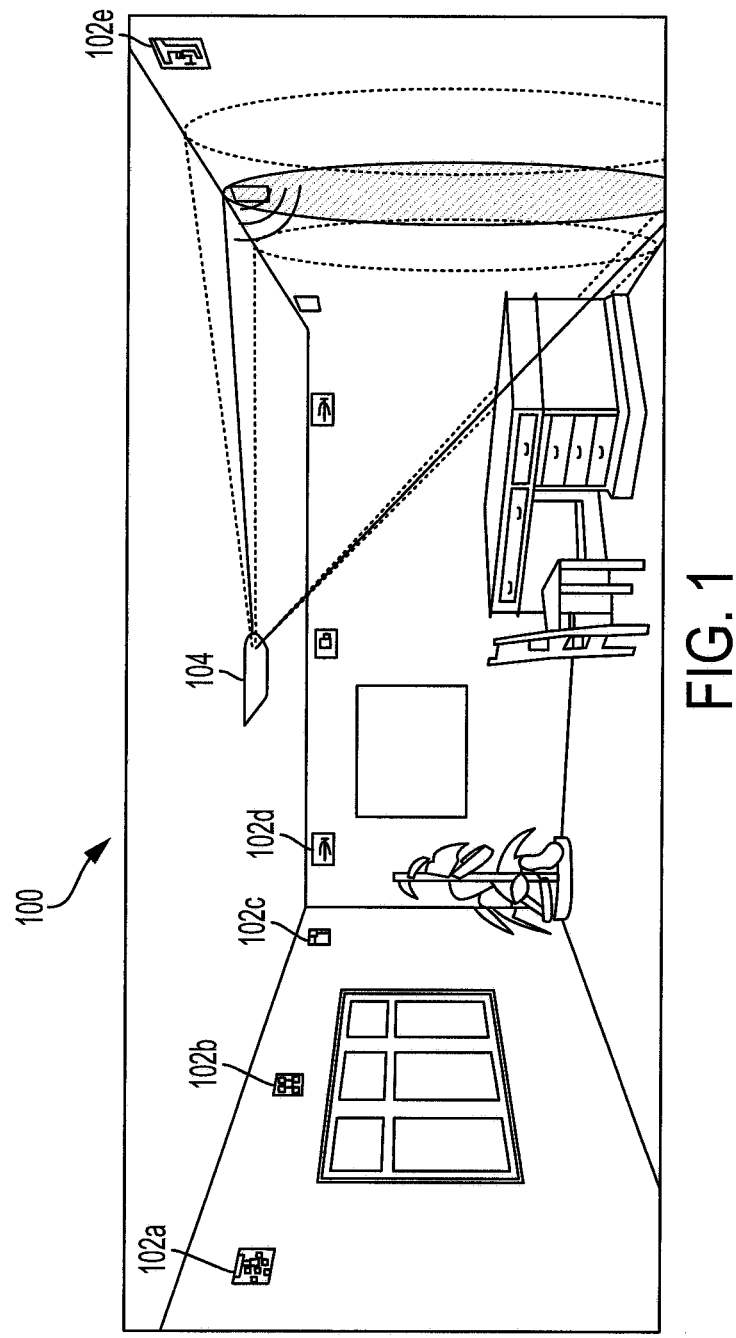
FIG. 1 is an exemplary graphical overview of a sensor system.

With respect to FIG. 1, an exemplary sensor system is shown. This system 100 delivers a sensor system 100 with battery-free nodes automatically located to within <0.5-m of their physical locations. The sensor system involves at least two components (1) sensor nodes 102a-102n, (2) a multi-directional RF hub 104 that serves as a power source and transceiver. One such example of a fabricated sensor node is a peel-and-stick plug-and-play flexible sensor nodes. The flexible sensor nodes 102 may be fabricated via flexible hybrid electronics (FHE) technology, which enables low-cost productization and flexibility by combining printed conductive traces and sensors with high-performance electronics. With additional reference to FIG. 2, the sensor nodes 102 are compatible with a variety of low-cost sensors relevant to building operation including but not limited to building temperature, light, occupancy, motion, air flow, and indoor air quality. The sensors may be printed or conventionally fabricated.

Commissioning a new sensor system can be time and cost intensive, requiring sensors to be connected to power and communications infrastructure and their locations to be entered into the building management system. Wireless sensors can simplify installation, but require a battery and/or means of energy harvesting, such as a photovoltaic device, which may provide only limited and/or intermittent power. This sensor system 100 addresses powering and commissioning challenges in existing wireless sensor systems, by providing power remotely, and automatically locating each sensor using beam steering. Returning attention to FIG. 2, energy is delivered from an RF hub 104, eliminating lifetime and/or power availability issues because the sensor nodes do not require an on board battery or other high-capacity energy storage device to power the sensor node and transmit or receive information (though they may be present in some embodiments). The RF hub 104 is configured to locate the sensor(s), enabling automatic commissioning and reconfiguration. The system allows building mapping if sensor nodes 102a, 102b, 102c, 102d, 102e are deployed around room peripheries. Dense sensor node deployment also improves calibration through redundancy and averaging the received information. Because these advantages reduce both material and operational costs, the system can accelerate and broaden the deployment of smart building sensor networks. The disclosed system has:

Conventionally or FHE fabricated sensor nodes,
Remote power delivery,
Wireless communication to building management systems 202, for reduced installation cost,
Automatic localization to a sensor node within 0.5-m, via steered antenna 206 topology, for reduced commissioning cost, and enabling automatic sensor recommissioning upon replacement,
Adaptability to multiple sensor nodes 102 of different types, for customizability.

The sensor nodes 102 are built around RF energy harvesting technology. The RF power received by the antennas 206 is rectified to power electronics to read and retransmit data from sensors. In this way, no additional power source is required and there are no limitations associated with power source lifetime or dependence on ambient light. Received RF energy can be stored on the sensor node in a capacitor, supercapacitor, or small rechargeable battery for powering circuitry to read sensor data and transmit it back to the RF hub.

Figure 2:
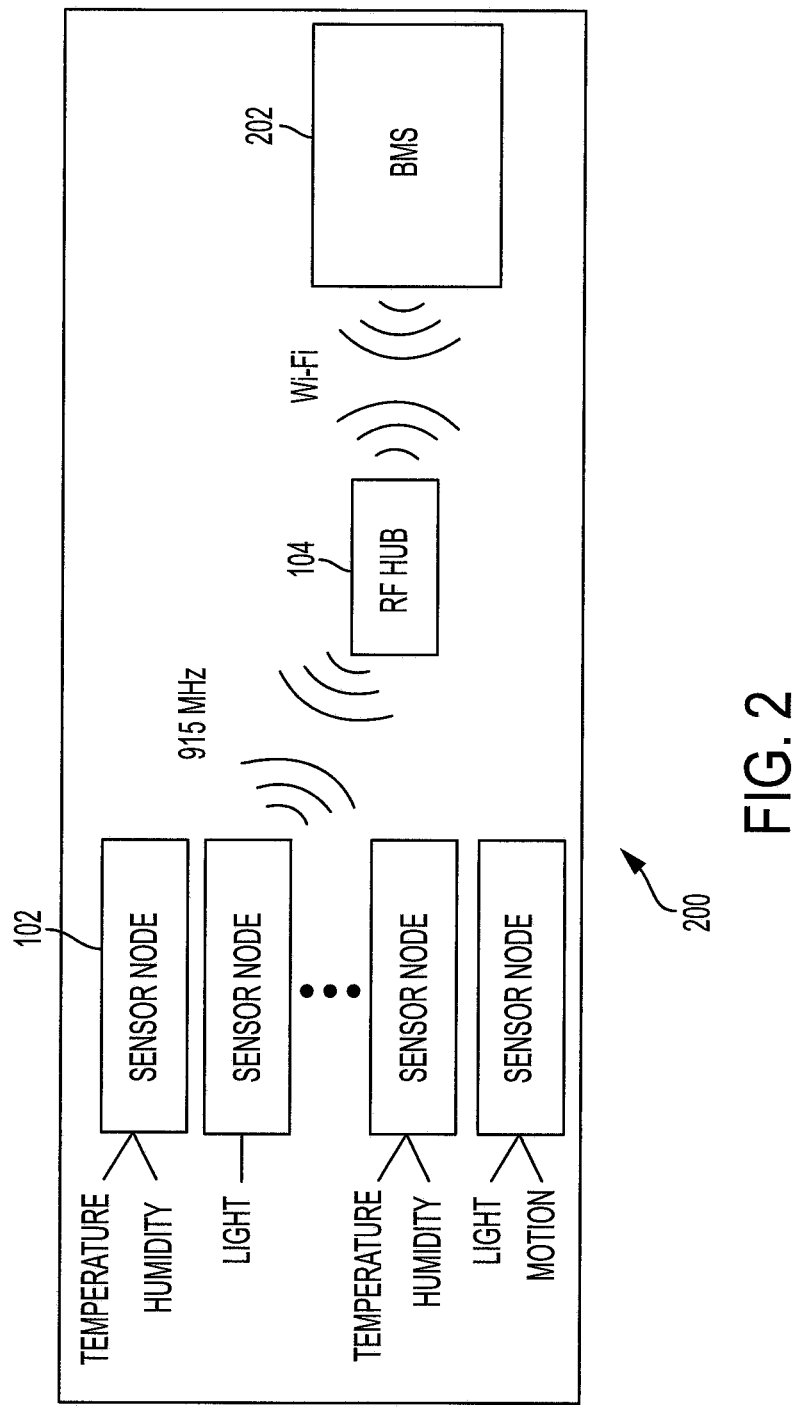
FIG. 2 is functional block diagram of a system overview for a sensor system employing various sensors.

With further respect to FIG. 2, showing a functional block diagram 200 of a sensor system employing various sensors. By using a programmable multi-element antenna 206 that allows directional control of the RF signal, the base station can provide RF power to the sensor nodes, receive the sensor data from the nodes, and locate the nodes for low-overhead and dynamic commissioning. Sensor node localization operates as follows. Using the multiple antennas, the RF hub selectively directs the RF energy to a sensor. Depending on the direction the RF power is directed by the antenna 206, a particular sensor node 102 will receive a percentage of the overall RF power. The system then uses the amount of power the sensor receives to determine where the sensor is physically located. Alternatively, the sensor node can transmit power back to the RF hub, optionally with information about the amount of power being transmitted. By comparing the received power through different combinations of the multiple antennas, the RF hub can determine the direction from which the sensor node is transmitting power. Distance between the RF hub and a sensor node can be determined with a comparison of the transmitted and received power either from the hub to the sensor node or from the sensor node to the RF hub. Power decreases as a function of distance in a well-understood manner.

The RF hub 104 can be connected to the building management system (BMS) 202 directly or wirelessly. A single RF hub 104 can support dozens of sensor nodes 102 within a 5-m, 10-m, or larger radius. This radius can be increased by trading off against localization accuracy or through future development. The sensor nodes 102, are responsible for collecting building condition information which includes temperature, humidity, light, motion, and other building conditions.

The proposed system 100 is further enhanced with automatic sensor localization and commissioning for plug-and-play installation that requires no training. As described above, the RF hub 104 additionally identifies sensor node locations based on comparative received power from transmission at multiple beam angles. Localization accuracy can be improved with the use of multiple RF hubs and tradeoffs among accuracy, read distance, and cost are available. With each hub servicing multiple sensors, the per-sensor cost can be extremely low. The number of sensors per hub depends on the deployment scenario. For example, tracking sunlight throughout the day could be enabled by installing sensors along room walls at ~1-m spacing, i.e., ~25 in a typical office. Personal comfort and occupancy monitoring benefits from sensors placed near desks, tables, etc., at 1-5 per room. HVAC and lighting monitoring is achieved with sensors at diffusers or light fixtures, at 4-10 per room.

The system 100 of FIG. 1 can utilize either conventionally-manufactured or printed sensors. In an embodiment, sensor label size is projected to be 6-cm-by-9-cm in area. Based on simulations primarily in AWR Microwave Office (MO) and previous measurement results, the antenna and full rectifier are understood to have electrical efficiencies of ~90% and ~75%, respectively, in the 900 MHz band. This band provides a favorably balance among the FCC approved power level, free-space path loss, multipath interference, and antenna size, however other band frequencies can be used.

Figure 3:
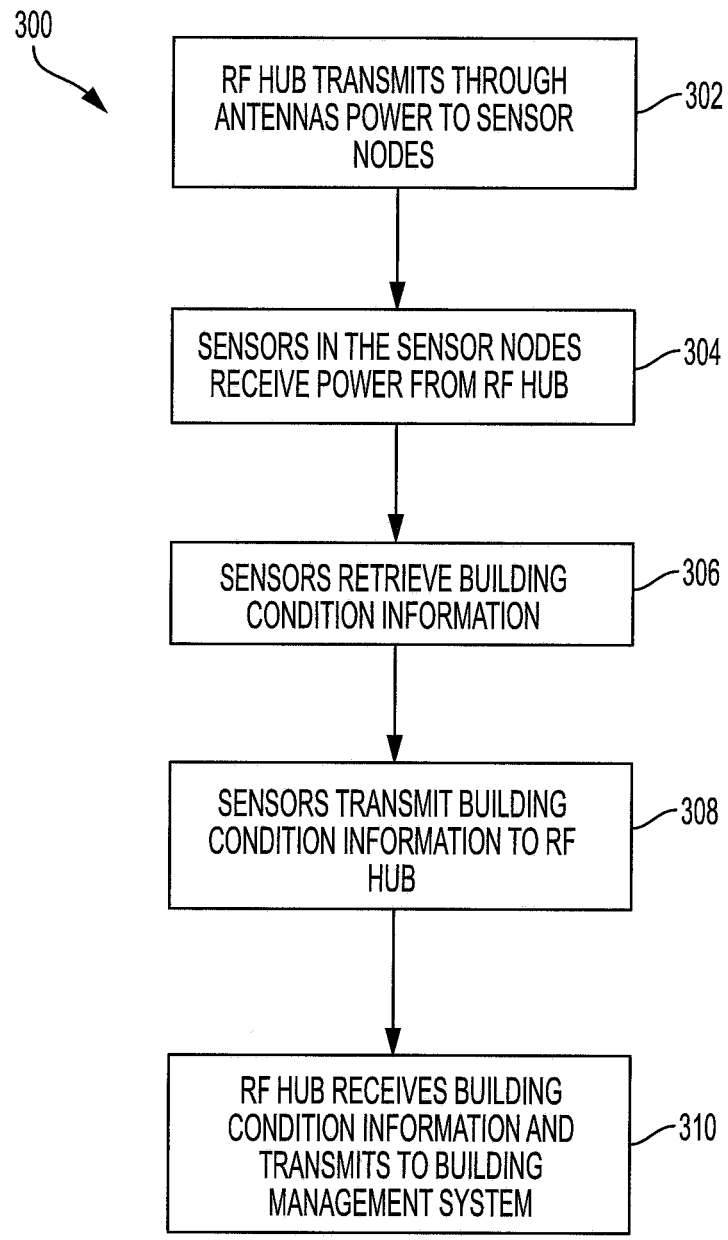
FIG. 3 illustrates a flowchart of a method of gathering building condition information as described by the embodiment.

With respect to FIG. 3, a flow chart of the exemplary method is illustrated. In step 302, the RF hub transmits power through an antenna to a plurality of sensor nodes. The power is received by the sensors in the sensor nodes 304 and used to charge an on board capacitor, supercapacitor, or small rechargeable battery. The sensor nodes do not have any other on board power supply. The sensors retrieve building condition information 306 which can include, but is not limited to, temperature, humidity, fire sensing systems, motion, light, etc. The sensor nodes then transmit 308 the building condition information the RF hub. The RF hub receives the building condition information, 310 and transmits the information to a building management system. The information is used to determine the current environmental conditions of the building and is also used in commissioning new sensors in the system to replace failed sensors or to provide more detailed building condition data.

Figure 4:
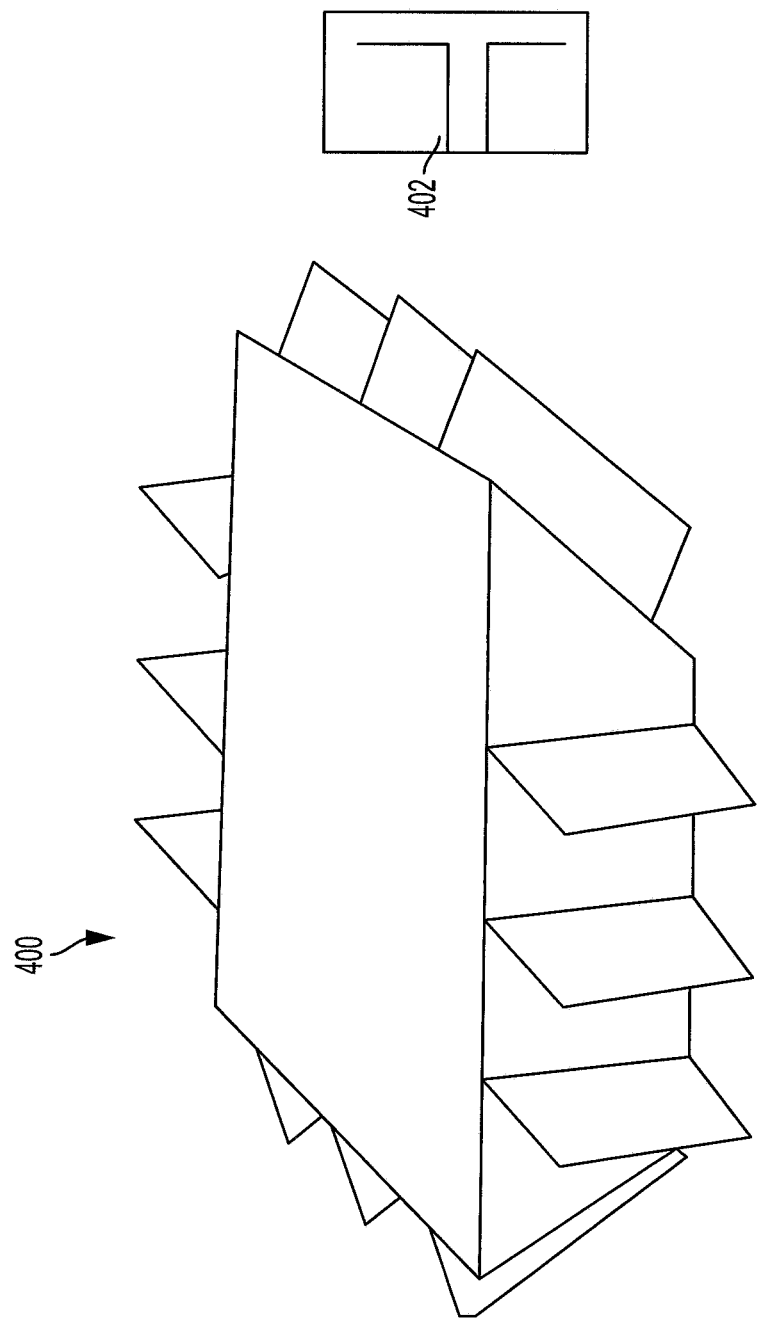
FIG. 4 illustrates an example of a ceiling mounted RF hub design.

With respect to FIG. 4, in one embodiment, the RF hub 104 that provides RF power and data communication comprises an antenna array 400 comprising four PCBs and has a total volume of 41-cm-by-41-cm-by-8-cm. In this embodiment on each PCB is a linear array of three antennas with half-wavelength spacing. Simulations in AWR Microwave Office show that selectively coupling these antennas to the transceiver allows for steering of the beam center ±45° for complete coverage of a room with the four arrays. Selective coupling can be achieved by use of RF hubs 104 that enable control of RF power circuit pathways. With such devices, the transmission power can be divided among the antennas in the array. For example, with 100% of the power in one antenna, Antenna A1, the RF beam will be centered. (i.e., have a power maximum) at a first direction, D1. With 100% of the power transmitted by a different antenna, Antenna A2, the RF beam will be centered in a second direction D2, which may be offset from D1 by 15° or some other angle depending on the design. By providing 50% of the power to A1 and 50% to A2, the beam will be centered halfway between D1 and D2. Increasing the number of switches allows finer control of the power division between the antennas, and finer control of the beam angle. Increasing the transmission frequency or increasing the number of antennas can also provide finer control.

Figure 5:
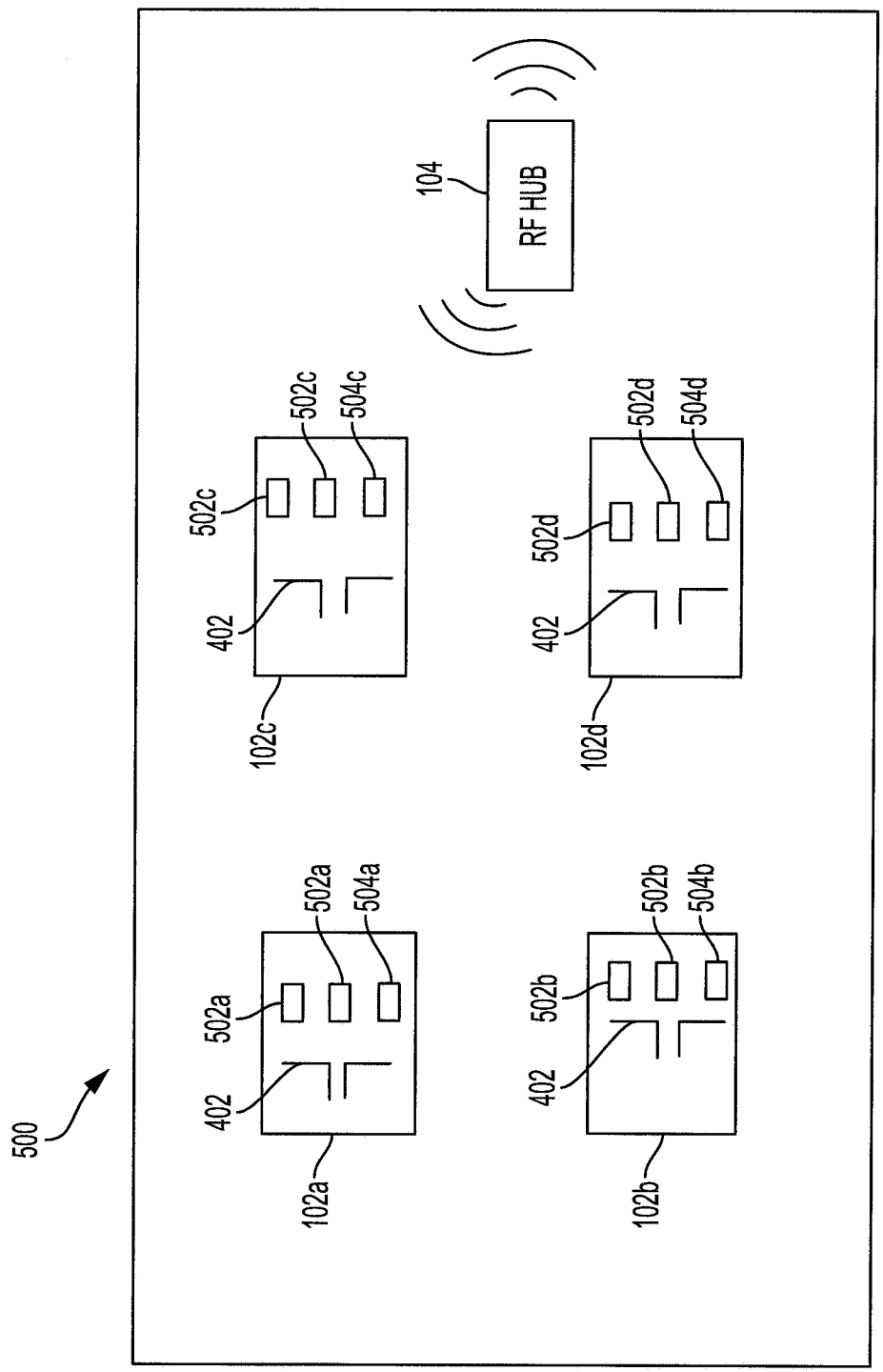
FIG. 5 illustrates a block diagram of an RF hub and sensor system.

With further respect to FIG. 5 illustrating a block diagram 500 of a preferred embodiment, each sensor node 102a, 102b, 102c, 102d is a flexible substrate with a printed antenna 402, several discrete components 502a, 502b, 502c, 502d, and a reading device 504a, 504b, 504c, 504d for reading and communicating sensor data to the RF hub.

Figure 6:
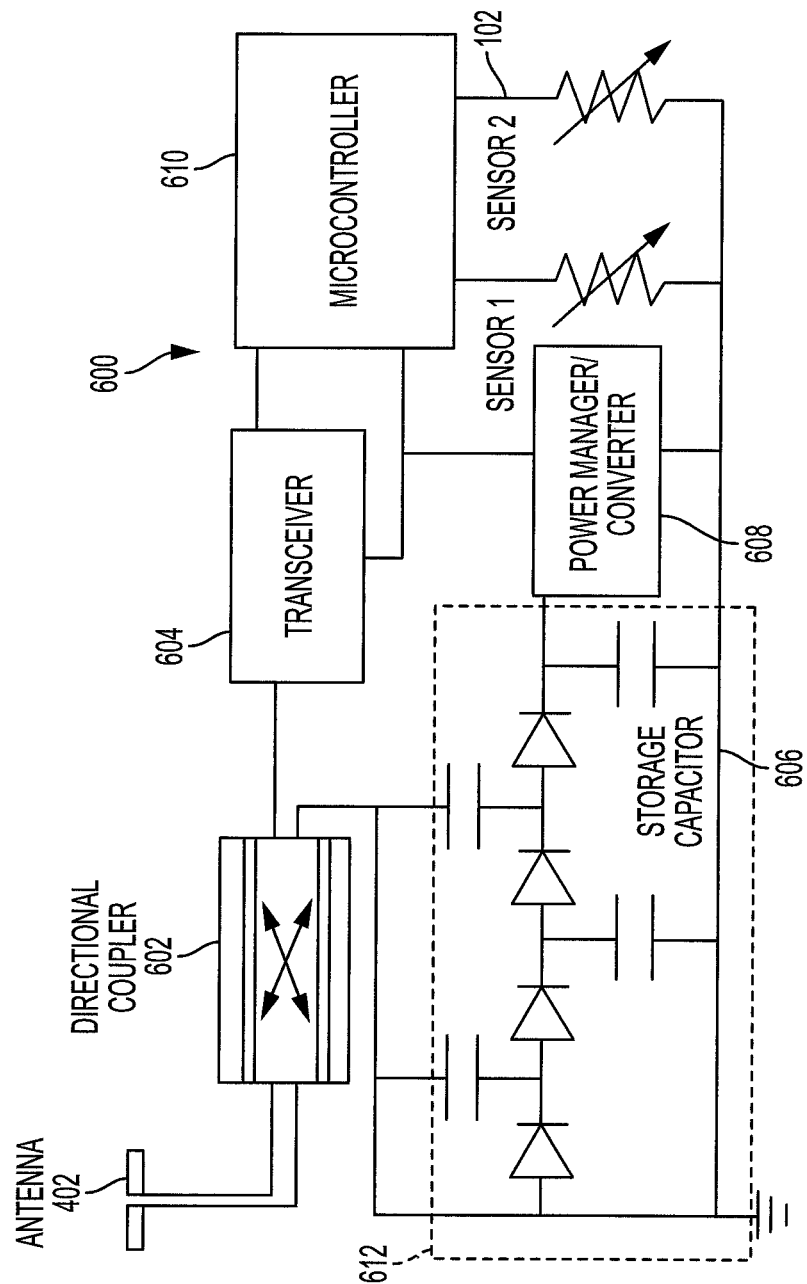
FIG. 6 illustrates an exemplary sensor circuit design.

With respect to FIG. 6, illustrated is a preliminary exemplary sensor label circuit 600 design. Directional coupler 602, or other type of RF switch, attached to the antenna 402, allows the sensor node to both receive RF (for power) to be stored in the capacitor arrangement 606, 608 and transmit via transceiver 604, and microcontroller 610 data to and from the sensors 102. The rectifier circuit 612 is just an example and can be replaced with a more general rectifying circuit. Alternatively, a dedicated power controller integrated circuit can be used to control power delivery and retrieval from the capacitor or other storage device. In the diagram of FIG. 6, the sensors are shown as variable-resistance devices. This is meant to be illustrative and not restrictive. Any type of sensor type can be used.

Figure 7:
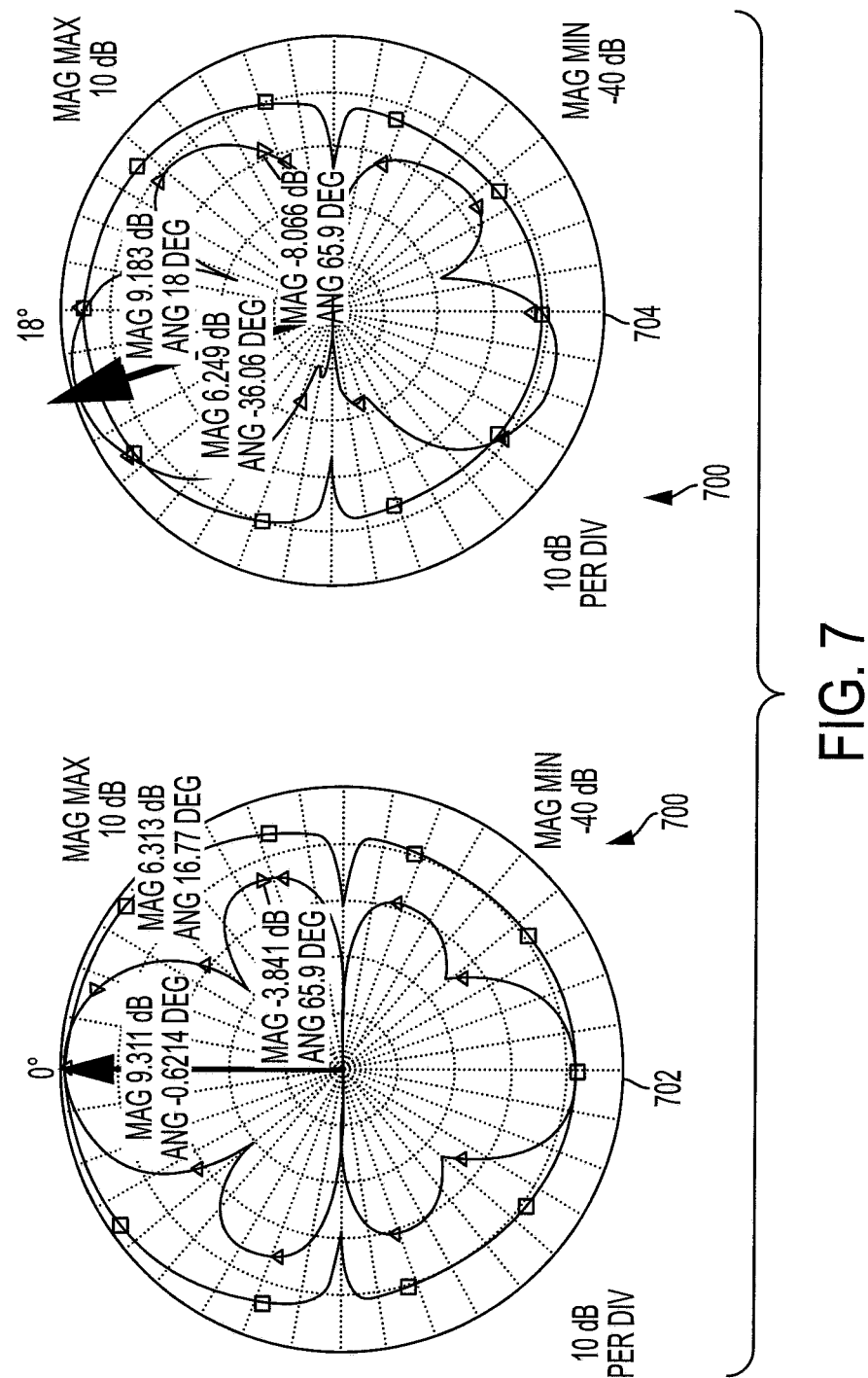
FIG. 7 is a graphical view of a steered RF hub with antenna array radiation patterns for locating sensor nodes.

As further shown in FIG. 7, in simulation, in an embodiment each antenna array 700 has 9.3 dB of gain with a half-power beam width of 33.5°. In the 900-MHz band with transmission at 38 dBm, the sensor would receive available power of 0.19 mW at 5-m and 0.05 mW at 10-m to charge a 100-µF mm-scale storage capacitor. With the appropriate duty cycle, this can provide 470 µW for 20-ms for reading sensors and transmitting the data. A low-power micro controller such as the TI MSP430L092, can operate at as low at 0.9 V and <~100 µW. With data transmission at a rate of 50 kb/s and transmission at −38 dBm, received power at the hub would be −90 dBm at 10-m, two orders of magnitude greater than the −109 dBm sensitivity of the TI CC1200 transceiver preliminarily selected for the design. Printed sensors can have average power consumptions of microwatts.

Sensor lateral location is determined by sweeping the hub transmission direction and comparing received signal strength indicators (RSSI) on the sensor nodes. As can be seen in the highly directional antenna patterns in FIG. 5, signal magnitude is correlated with position. As shown, 702 and 704 beam steering will cover ±45° in 7.5° steps respectively, giving ~0.65-m resolution at 5-m. Using comparative information from adjacent beam angles can halve this, with further accuracy improvements available. Sensor distance can be inferred from relative signal strength supported by high-fidelity RF models and measured component data. Based on simulated beam width and receiver sensitivity, positional accuracy for sensor localization is expected to range from 0.5-m at a 5-m reading distance to 1-m at a 10-m distance. Vertical localization is easily added with the extension to two-dimensional antenna arrays on the hub.

Figure 8:
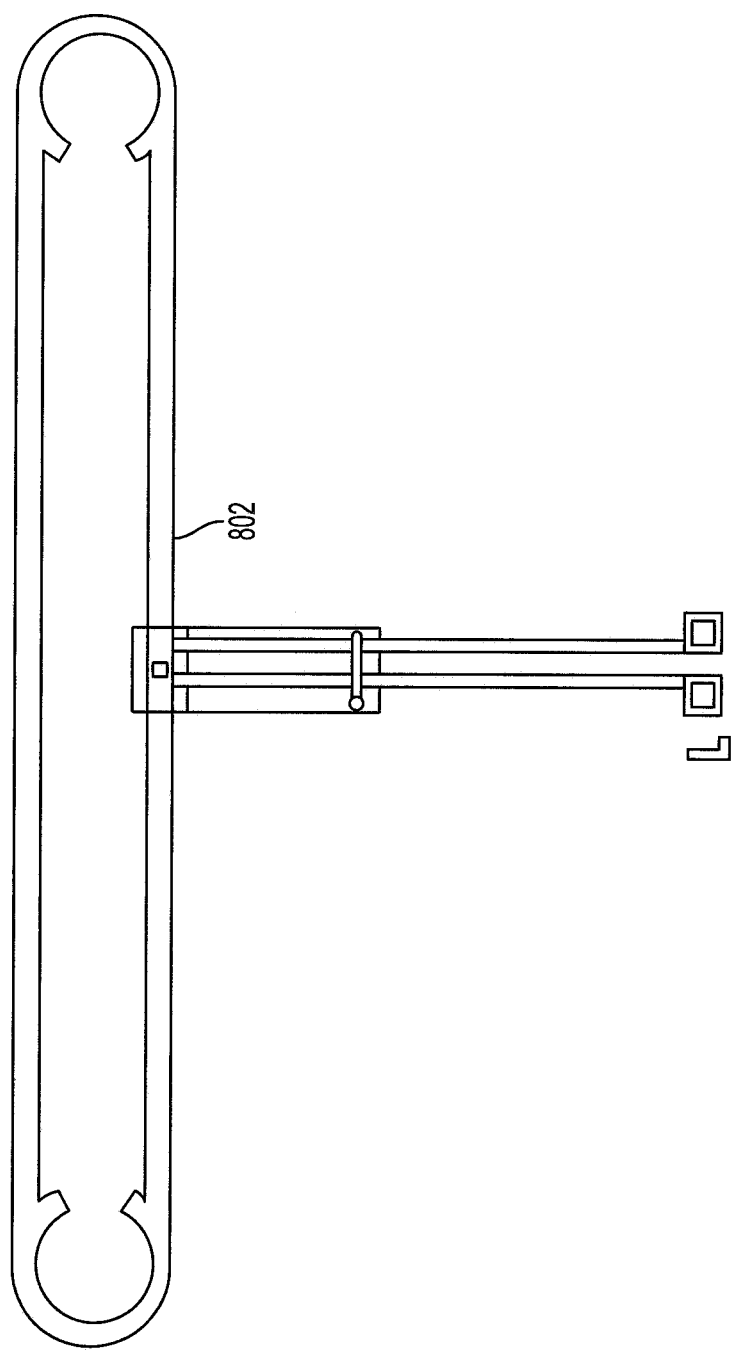
FIG. 8 illustrates one embodiment of a printed antenna used in the exemplary embodiment.
Figure 9:
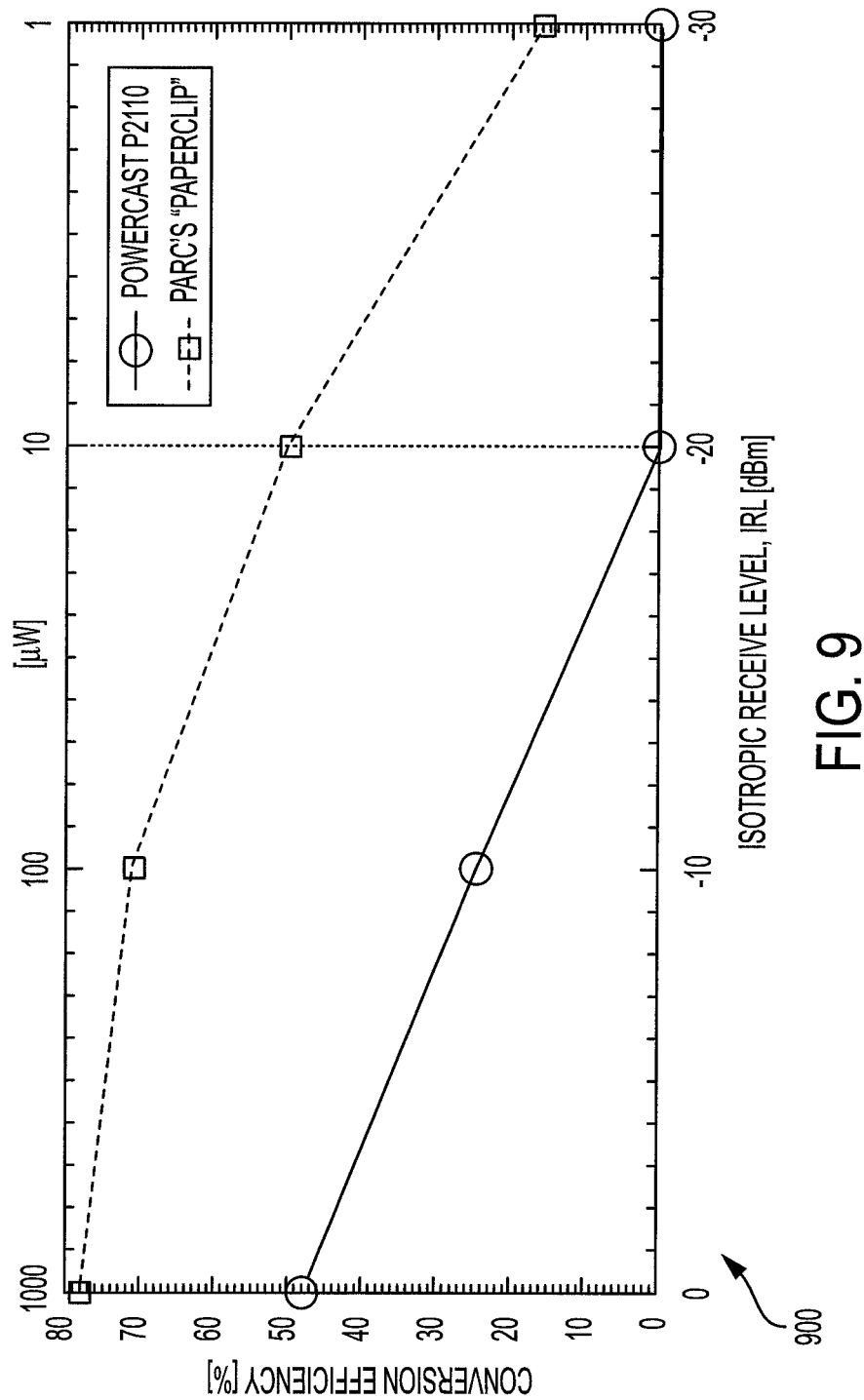
FIG. 9 is a graphical view of conversion efficiency of various rectifying antennas for capturing ambient RF energy.

In one embodiment to achieve low cost and peel-and-stick deployment, the sensor nodes are fabricated through Flexible Hybrid Electronics (FHE) technology. The FHE technology platform combines printed electronics with conventional electronic components to deliver low-cost, low-profile, high-performance flexible systems and enable fabrication of small, flexible, peel-and-stick sensor labels compatible with volume manufacturing. The sensor label can utilize printed or off-the-shelf conventional sensors. Printed sensors include optical, temperature, humidity, pressure, strain, gas, air flow, and chemical sensors. Print fabrication imparts the additional benefit of thin low-loss substrates for very high efficiency antennas. FIG. 8 shows one such example of a printed antenna 802. With respect to FIG. 9, the diagram 900 shows that with an electrically small antenna, a FHE rectifier has a conversion efficiency >78% at high power levels. Printed transmission lines allow impedance matching to a wide range of transceivers.

The above discussion has presented a system of sensor nodes combined with an RF hub that transmits RF power to the sensors and receives data from the sensor nodes. The sensor nodes contain one or more sensors for measuring indoor conditions including humidity, temperature, air flow speed, air flow direction, gas concentration ($CO_2$, methane, CO, formaldehyde, VOCs), particulates, or other quantities. The system also includes an antenna, an energy storage element such as but not limited to a capacitor arrangement, supercapacitor arrangement, or secondary (rechargeable) battery, and electronics for powering the system via harvesting RF energy (electric fields), reading sensor data, and communicating sensor data. The sensors, antenna, and other components on the sensor nodes can be fabricated conventionally, or via printing. They may be fabricated as "flexible hybrid electronics", in which conventional components are bonded onto flexible substrates.

The RF hub consists of one or more antennas capable of transmitting RF power, electronics for steering the center of radiation of the RF power in at least one direction (parallel with the floor) or in more than one direction (also vertically) (beam steering), and electronics for receiving a demodulating RF data signal. The RF hub may be connected to the building's power system such that the RF hub draws its power directly from the building.

Beam steering may be accomplished by using multiple antennas and selectively sending the power signal through the antenna. Other methods of beam steering, such as via a phased array may also be used. One design has four PCBs arranged to form a square, with each PCB containing three antennas. Any combination of adjacent antennas can be coupled to the transceiver to steer the beam. The sensor node converts RF power received from the RF hub to DC voltage via a rectifying circuit. RF energy is stored on an energy storage device, e.g., a capacitor, for use powering the sensor circuitry. In operation, the sensor node reads data from the sensor or sensors and sends that data back with a modulated RF signal. The same antenna can be used for receiving and transmitting. Alternatively, separate antennas can be used. The signal can be modulated in any known method including frequency modulation, amplitude modulation, frequency shift keying, or others. The sensor node can also send a data signal representing the magnitude of the RF power it received from the hub.

In another embodiment, power is transmitted at a first frequency or in a first frequency band, and data is transmitted at a second carrier frequency or a second frequency band.

The hub receives the sensor data and transmits the sensor data to the building management system for use in building efficiency improvements (for example, reducing heating on a part of the room with higher than expected temperature because of sunlight radiation). The sensors transmit RF power data that is used by the RF hub (or the BMS) to determine sensor location by comparing received power levels corresponding to different steered beam directions. For example, if the hub sends power in directions D1 and D2 and the power level received by the sensor is higher from the first signal than the second, then the sensor is closer to D1 than D2.

Additional features facilitate and/or improve localization of the sensors. For example, if a room identification number (ID) is encoded into the sensor, ambiguity as to which side of a wall a sensor is on is avoided. This further allows building mapping by assigning room IDs to sensors during installation, associating corresponding room IDs with rooms, and using localization data to determine wall locations. IDs may also not be unique to rooms, but may be one of a set of "colors" identifying different sets of sensor nodes. If each room is equipped only with sensor nodes with a certain color and adjacent rooms have distinct colors, ambiguity can be avoided. Localization can also be improved by using multiple hubs and comparing signals from them as received by each sensor. The system can automatically update sensor locations when sensors they are relocated or moved. The RF power delivery and sensor data reception can comprise different electronic units. Also, the system can work without the localization feature.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The exemplary embodiment also relates to an apparatus for performing the operations discussed herein. This apparatus may be specially constructed for the required purposes, or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A wireless system for measuring indoor building conditions comprising:
   a remote RF hub within a building, the remote RF hub having a plurality of programmable multi-element antennas configured to transmit RF power within the building, and a processor configured to beam steer a center of radiation of a power signal through the multi-element antennas; and
   a plurality of sensor nodes positioned at locations within the building to receive the power signal so as to be powered by the remote RF hub, the plurality of sensor nodes configured to send and receive building data, wherein a location of each sensor node of the plurality of sensor nodes in the indoor building is automatically determined by at least one of (i) configuring each sensor node of the plurality of sensor nodes to transmit RF power data that is used by the RF hub to automatically determine the location of each sensor node of the plurality of the sensor nodes by comparing received power levels corresponding to different beam directions, and (ii) configuring each sensor node of the plurality of sensor nodes to transmit power back to the RF hub with information about an amount of power being transmitted, wherein by comparing the received power through different combinations of the multiple antennas the RF hub is configured to automatically determine the direction from which the each of the sensor nodes are transmitting power,
   and wherein distances between the RF hub and each of the sensor nodes can be determined with a comparison of the transmitted and received power either from the RF hub to the each of the sensor nodes or from each of the sensor nodes to the RE hub.

2. The wireless system of claim 1, further including a processor configured to beam steer the center of radiation of the RF power to automatically locate each of the plurality of sensor nodes.

3. The wireless system of claim 1, wherein the plurality of sensor nodes are peel and stick sensor nodes which convert RF power received from the RF hub to DC power.

4. The wireless system of claim 1, wherein the plurality of sensor nodes includes:
   logic circuitry configured to control power to the sensor node using harvested RF energy and to read and transmit sensor data;
   at least one antenna; and
   one or more sensors with an onboard energy storage device for powering the sensor via harvested RF power, and electronic circuitry for reading building data from the sensor.

5. The wireless system of claim 4, wherein the plurality of sensor nodes includes an encoded room identification number (ID), the room ID providing additional information regarding the room to the building management including building mapping using room IDs assigned during installation, wall mapping, and localization data to determine wall locations.

6. The wireless system of claim 1, wherein the RF hub comprises:
   one or more antennas capable of transmitting RF power;
   a processor configured to beam steer the center of radiation of the RF power in at least one direction or in more than one direction to transmit a power signal through an antenna;
   a transmitter configured to transmit power to the one or more sensors and to a building management system; and
   a transceiver configured to receive and demodulate an RF data signal and sensor data from the sensor nodes.

7. The wireless system of claim 6, wherein the processor configured to beam steer is used to automatically locate each sensor node.

8. The wireless system of claim 6, wherein steering of the RF power is configured by selectively coupling one or more of a set of antennas to a transceiver.

9. The wireless system of claim 6, wherein steering of the RF power is configured via a phased-array antenna.

10. The wireless system of claim 6, wherein the RF hub receives sensor data and transmits the sensor data to a building management system for use in a building efficiency improvements.

11. The wireless system of claim 1, wherein the steering direction is in both horizontal and vertical directions.

12. A plurality of wireless sensor nodes powered by centralized RE power for measuring indoor building conditions of a building comprising:
- at least one antenna configured to receive the centralized RF power in the form of a power signal from a remote RF hub located within the building, the remote RF hub having a plurality of programmable multi-element antennas configured to transmit the centralized RF power in the form of a power signal, and a processor of the remote RF hub configured to beam steer a center of radiation of the power signal through the multi-element antennas;
- one or more sensors; and
- a processor for each of the plurality of sensor nodes configured to:
  - control power to the sensor node via harvested RF energy;
  - read sensor data of a corresponding sensor; and
  - communicate sensor data, wherein the plurality of sensor nodes are positioned at locations within the building to receive the power signal so as to be powered by the remote RF hub,
- wherein a location of each sensor node of the plurality of sensor nodes in the indoor building is automatically determined by at least one of (i) configuring each sensor node of the plurality of sensor nodes to transmit RF power data that is used by the RF hub to automatically determine the location of each sensor node of the plurality of the sensor nodes by comparing received power levels corresponding to different beam directions, and (ii) configuring each sensor node of the plurality of sensor nodes to transmit power back to the RF hub with information about an amount of power being transmitted, wherein by comparing the received power through different combinations of the multiple antennas the RF hub is configured to automatically determine the direction from which the each of the sensor nodes are transmitting power,
- and wherein distances between the RF hub and each of the sensor nodes can be determined with a comparison of the transmitted and received power either from the RF hub to the each of the sensor nodes or from each of the sensor nodes to the RF hub.

13. The plurality of wireless sensor nodes of claim 12, wherein each of the plurality of sensor nodes includes:
- an onboard energy storage device for powering the sensor via harvested RF power;
- a receiver for receiving building data; and
- a transmitter for sending sensor data.

14. The plurality of wireless sensor nodes of claim 13, wherein the onboard energy storage device is one of a capacitor, a supercapacitor, or rechargeable battery.

15. The plurality of wireless sensor nodes of claim 12, wherein the one or more sensors measures building conditions including at least one or more of humidity, temperatures, air flow speed, air flow direction, $CO_2$ concentration, CO concentration, methane concentration, formaldehyde concentration, VOC concentration, or particulates.

16. The plurality of wireless sensor nodes of claim 12, wherein each of the plurality of the sensor nodes modulates an RF signal with sensor value data and transmits the modulated signal.

17. The plurality of wireless sensor nodes of claim 16, wherein the modulated RF signal is an incoming signal and transmission is based on backscatter.

18. The plurality of wireless sensor nodes of claim 12, wherein each of the plurality of sensor nodes transmits data indicating the received RF power level.

19. The plurality of wireless sensor nodes of claim 12, wherein each of the plurality of sensor nodes transmits a unique identifying number or a non-unique identifying number.

20. The plurality of wireless sensor node of claim 12, wherein each of the plurality of sensor nodes and at least one antenna is fabricated conventionally, or via printing and wherein the printed one or more sensors and at least one antenna may be fabricated as flexible hybrid electronics, wherein conventional components are bonded onto flexible substrates.

21. A method for measuring indoor building conditions, the method comprising:
- transmitting power from an RF hub, within a building, to one or more sensor nodes located in the building, the remote RF hub having a plurality of programmable multi-element antennas configured to transmit RF power within the building, and a processor configured to beam steer a center of radiation of a power signal through the multi-element antennas; and
- receiving power in the form of a power signal, on the one or more sensor nodes from the RF hub, the sensor nodes including:
- at least one antenna;
- one or more sensors configured to transmit building conditions; and
- a processor configured to read building conditions from the one or more sensors and transmit to the RF hub, wherein the one or more sensor nodes are at locations within the building positioned to receive the power signal so as to be powered by the remote RF hub, the one or more sensor nodes configured to send and receive building data,
- wherein a location of each sensor node of the plurality of sensor nodes in the indoor building is automatically determined by at least one of (i) configuring each sensor node of the plurality of sensor nodes to transmit RF power data that is used by the RF hub to automatically determine the location of each sensor node of the plurality of the sensor nodes by comparing received power levels corresponding to different beam directions, and (ii) configuring each sensor node of the plurality of sensor nodes to transmit power back to the RF hub with information about an amount of power being transmitted, wherein by comparing the received power through different combinations of the multiple antennas the RF hub is configured to automatically determine the direction from which the each of the sensor nodes are transmitting power,
- and wherein distances between the RF hub and each of the sensor nodes can be determined with a comparison of the transmitted and received power either from the RF hub to the each of the sensor nodes or from each of the sensor nodes to the RF hub.

* * * * *